United States Patent [19]
Walles et al.

[11] Patent Number: 5,849,818
[45] Date of Patent: Dec. 15, 1998

[54] SKIN SULFONATED PARTICLES IN MATRICES

[76] Inventors: Wilhelm E. Walles, 6648 N. River Rd., Freeland, Mich. 48623; Luis C. Mulford, 800 Linwood Dr., Midland, Mich. 48640

[21] Appl. No.: 72,398

[22] Filed: Jun. 3, 1993

[51] Int. Cl.[6] .................................................. C08J 3/00
[52] U.S. Cl. .................................. 524/8; 524/35; 524/76; 525/122; 525/157; 525/222
[58] Field of Search ........................................ 524/8

[56] References Cited

U.S. PATENT DOCUMENTS

| | | |
|---|---|---|
| 200,122 | 2/1878 | Bailey . |
| 365,746 | 6/1887 | Hirsching ........................ 422/188 X |
| 500,485 | 6/1893 | Gallinowsky ........................ 106/665 |
| 759,332 | 5/1904 | Waite ........................ 264/83 |
| 1,242,189 | 10/1917 | Hofer ........................ 264/83 |
| 1,479,394 | 1/1924 | Meade ........................ 264/83 |
| 1,864,621 | 6/1932 | Sprunger ........................ 264/83 |
| 1,881,742 | 10/1932 | Lillienfeld ........................ 264/83 |
| 1,940,528 | 12/1933 | Bond ........................ 404/32 X |
| 1,941,499 | 1/1934 | Siems ........................ 422/232 |
| 1,972,207 | 9/1934 | Tucker ........................ 106/24 |
| 1,972,208 | 9/1934 | Tucker ........................ 106/24 |
| 2,058,480 | 10/1936 | McCallum et al. ........................ 23/224 |
| 2,400,720 | 5/1946 | Staudinger et al. . |
| 2,483,806 | 10/1949 | Buckley et al. ........................ 106/96 |
| 2,538,030 | 1/1951 | Newton ........................ 422/232 |
| 2,670,946 | 3/1954 | Royster . |
| 2,676,909 | 4/1954 | Bethea ........................ 422/188 X |
| 2,768,199 | 10/1956 | Luntz et al. ........................ 422/188 X |
| 2,786,780 | 3/1957 | Walles et al. . |
| 2,811,468 | 10/1957 | Joffre ........................ 215/1 C |
| 2,832,696 | 4/1958 | Walles ........................ 427/322 X |
| 2,935,372 | 5/1960 | Steuber . |
| 2,937,066 | 5/1960 | Walles ........................ 8/513 |
| 3,072,618 | 1/1963 | Turbak ........................ 525/340 |
| 3,129,063 | 4/1964 | Zirngibl ........................ 422/233 X |
| 3,218,301 | 11/1965 | Moody et al. . |
| 3,556,895 | 1/1971 | Mallonee ........................ 264/83 |
| 3,560,166 | 2/1971 | Walles ........................ 23/285 |
| 3,577,893 | 5/1971 | Towner . |
| 3,613,957 | 10/1971 | Walles ........................ 427/255.4 |
| 3,617,338 | 11/1971 | Caiola ........................ 264/83 X |
| 3,642,728 | 2/1972 | Canter ........................ 525/340 |

(List continued on next page.)

FOREIGN PATENT DOCUMENTS

| | | | |
|---|---|---|---|
| 896627 | 3/1972 | Canada | ........................ 264/83 |
| 1100712 | 1/1968 | United Kingdom . | |

OTHER PUBLICATIONS

Midland Daily News, "Tired up—Coalition Technologies Turns Weakness into Strength," Section A, p. 10, Sunday, Feb. 28, 1993.

Brooke et al., Chilton's Automotive Industries, "Recyclability," Sep. 1990, pp. 40–56 (as 40–42, 44–48, 50,52, & 56).

Krulak, The Detroit News, "The Waste of Requiring Paper Recycling," Oct. 26, 1992, p. 7A.

Reisch, Chemical & Engineering News, "Rubber—Slow Growth Ahead," May 10, 1993, pp. 24–33.

Primary Examiner—Joseph L. Schofer
Assistant Examiner—Christopher Henderson
Attorney, Agent, or Firm—Christopher John Rudy

[57] ABSTRACT

Solid organic polymers, for example, rubber and plastic particles, which may include coated papers, to especially include as recovered from recycle streams, can be made to have a sulfonated outer layer by treatment with a reactant gas containing sulfur trioxide. A silo apparatus can be employed to make these sulfonated particles, wherein untreated particles fall through the silo which is provided with a reactant gas supply. The sulfonated particles may optionally be neutralized, for example, with moist ammonia. These sulfonated particles can be used in articles of manufacture such as aggregates in cements, organic resins, cellulosics, and so forth, with beneficial properties being imparted to the composite. When used in a Portland cement, for example, increased performance concrete can result. Also, sulfonated sheets may be correspondingly employed for the sulfonated particles.

20 Claims, 4 Drawing Sheets

U.S. PATENT DOCUMENTS

| | | | |
|---|---|---|---|
| 3,677,780 | 7/1972 | Nishi et al. | 106/90 |
| 3,732,791 | 5/1973 | Hohwiller et al. | 404/31 |
| 3,740,258 | 6/1973 | Walles | 220/1 R |
| 3,836,511 | 9/1974 | O'Farrell et al. | 525/344 |
| 3,844,251 | 10/1974 | Evans et al. | 422/188 X |
| 3,846,079 | 11/1974 | Alagy et al. | 422/188 X |
| 3,862,284 | 1/1975 | Dixon et al. | 264/83 |
| 3,947,539 | 3/1976 | Lane | 264/320 |
| 3,997,502 | 12/1976 | Schaupp | 260/37 R |
| 3,998,180 | 12/1976 | Hawkins et al. | 118/5 |
| 4,014,831 | 3/1977 | Bock et al. | 260/23 H |
| 4,032,353 | 6/1977 | Ball et al. | 106/90 |
| 4,093,690 | 6/1978 | Murray | 264/82 |
| 4,125,578 | 11/1978 | Sear | 264/29.5 |
| 4,157,432 | 6/1979 | Lundberg et al. | 526/31 |
| 4,220,573 | 9/1980 | Bock et al. | 260/23.5 A |
| 4,220,739 | 9/1980 | Walles | 525/344 |
| 4,293,341 | 10/1981 | Dudley et al. | 106/88 |
| 4,336,015 | 6/1982 | Rainville | 425/74 |
| 4,345,944 | 8/1982 | Kazama et al. | 106/90 |
| 4,371,574 | 2/1983 | Shefford | 428/35 |
| 4,377,415 | 3/1983 | Johnson | 524/8 |
| 4,386,185 | 5/1983 | MacDonell et al. | 524/566 |
| 4,394,333 | 7/1983 | Fukushima et al. | 264/37 |
| 4,396,567 | 8/1983 | Rainville | 264/83 |
| 4,407,676 | 10/1983 | Restrepo | 106/88 |
| 4,487,864 | 12/1984 | Bermudez | 524/2 |
| 4,496,718 | 1/1985 | Rudy | 536/56 |
| 4,615,914 | 10/1986 | Walles | 427/237 |
| 4,666,452 | 5/1987 | Nohr et al. | 8/115.52 |
| 4,701,290 | 10/1987 | Eschwey et al. | 264/40.1 |
| 4,743,419 | 5/1988 | Bierschenk | 264/83 |
| 4,752,428 | 6/1988 | Williams et al. | 264/83 |
| 4,775,587 | 10/1988 | Walles | 428/305.5 |
| 4,818,511 | 4/1989 | Nishi et al. | 423/344 |
| 4,861,250 | 8/1989 | Walles et al. | 425/90 |
| 4,880,675 | 11/1989 | Mehta | 264/83 |
| 4,902,493 | 2/1990 | Walles et al. | 423/522 |
| 4,915,912 | 4/1990 | Walles et al. | 422/160 |
| 4,936,918 | 6/1990 | Furuhashi et al. | 106/808 |
| 4,938,998 | 7/1990 | Stock | 427/223 |
| 5,030,399 | 7/1991 | Walles et al. | 264/83 |
| 5,112,405 | 5/1992 | Sanchez | 106/608 |
| 5,156,783 | 10/1992 | Seizert et al. | 264/83 |
| 5,348,621 | 9/1994 | Rudy | 162/100 |

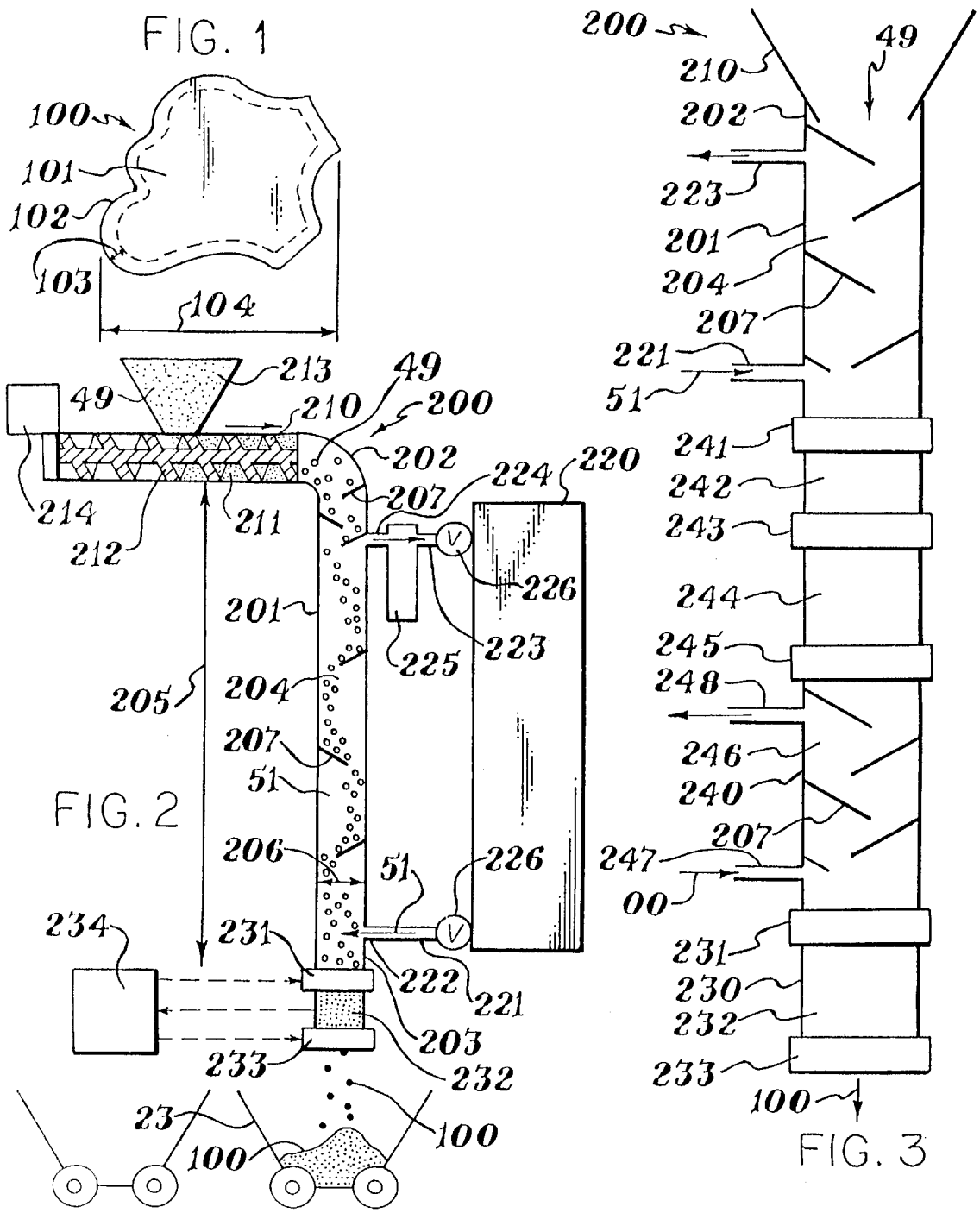

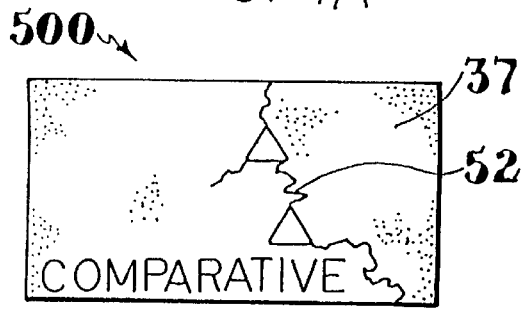
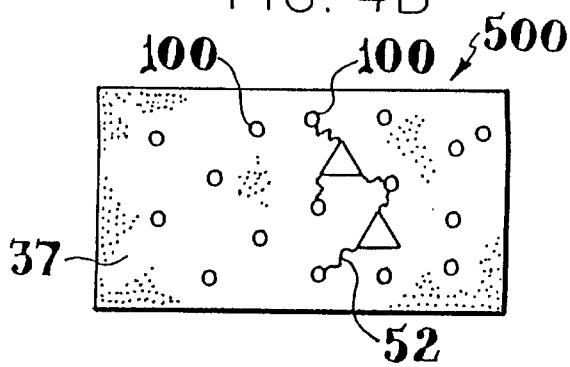
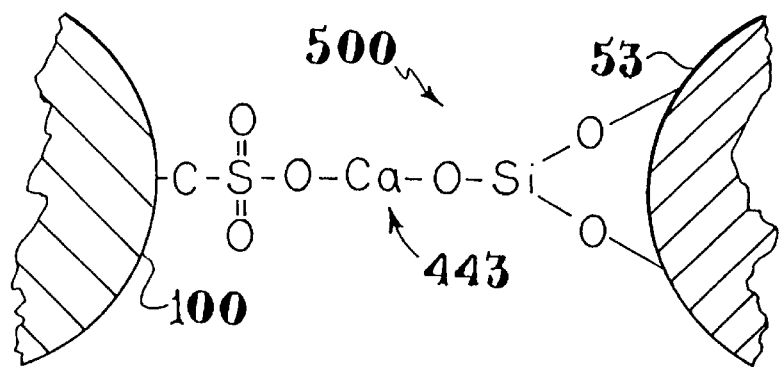
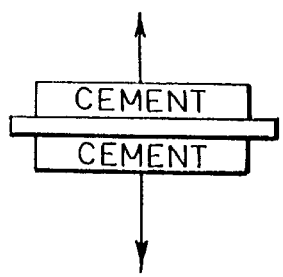
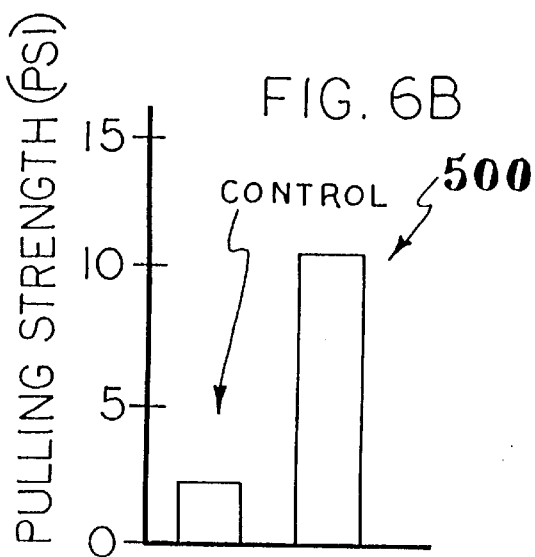

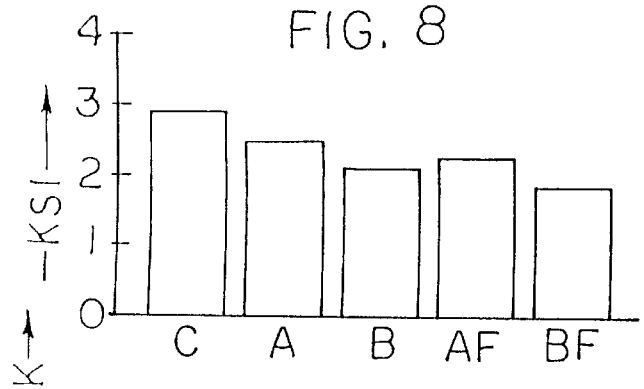
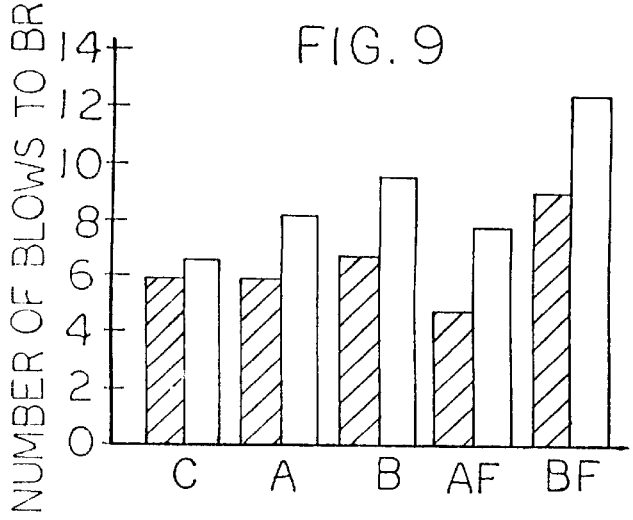
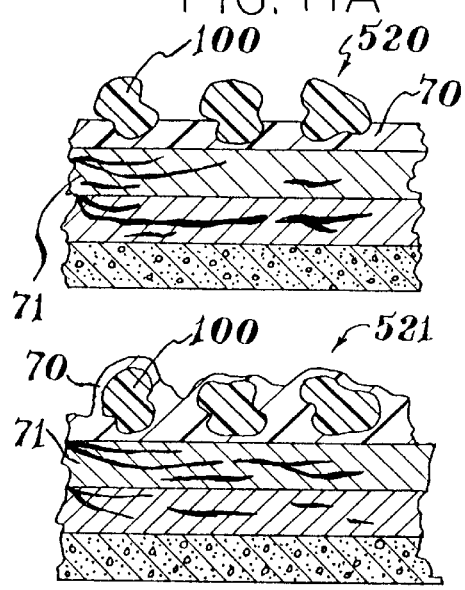
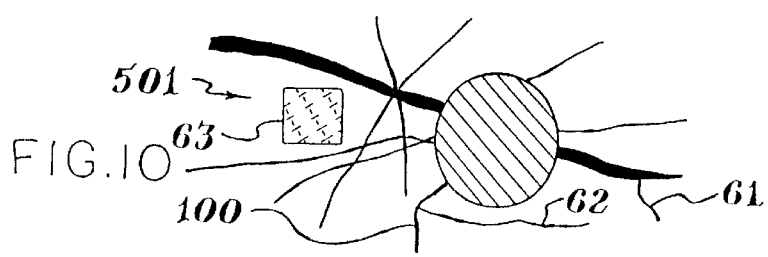

SKIN SULFONATED PARTICLES IN MATRICES

FIELD OF THE INVENTION

The present invention concerns solid, organic polymer containing materials, to include rubber and plastic particles, to especially include as recovered from recycle streams, which particles are made to have a sulfonated outer layer, a method and an apparatus to make these sulfonated particles, and sulfonated polymer sheets and use of these sulfonated particles and sheets to include in articles of manufacture such as aggregates in cements, organic resins, cellulosics, and so on.

BACKGROUND TO THE INVENTION

An enormous problem we all face stems from the plethora of used rubber tires from automobiles, trucks, and so forth, which have been, and continue to be, generated. It is estimated, for example, that the U.S. generates about 300 million scrap tires per year on top of the 3 billion tires sitting in various dump sites. See, Brooke et al., *Chilton's Automotive Industries*, pages 40 to 56, September 1990. About 3 million tons (2.7 million metric tons) of waste rubber is estimated to be generated annually in the U.S. alone. It is quite expensive and inefficient to reclaim rubber components from the used tires since, among other major industrial concerns, cords such as nylon, polyester and/or steel run through a large proportion of the used tire rubber volume. Thus, only a mere fraction of used rubber tires are reclaimed. Even reclamation by retreading, which typically provides an inferior product, does not begin to dent the problem.

Accordingly, long ago it was proposed to shred, grind, or pelletize such refuse, and employ the rubber particles as an aggregate in cement. However, the proposal was not accepted. The rubber particles do not add any significant property benefit to the cement to justify the cost of preparing them for use as an aggregate therein, and actually can cause weakening of the cement due to crack propagation, primarily caused by the basic fact that it is not cement that adheres to the rubber particles, but air. Thus, the rubber particles serve as crack initiators within the concrete network, where the rubber particles have characteristics similar to air spaces in the concrete network.

Concrete itself must be poured under a wide range of conditions, and cure for about 28 days. Among problems faced in concrete curing is a problem of shrinkage, which can cause severe cracks. That is why freshly poured concrete is kept covered and wet for 28 days. The shrinkage cracks alone are a serious source or cause of the rather poor flexural strength of concrete.

Also, since rubber is hydrophobic, it has been proposed to employ the rubber particles as a filler in asphalt surfacing. This proposal seemed to show some promise, and in some locales is mandated by law. However, it is not widely accepted since the paving mixture typically requires pure rubber, i.e., without reinforcing cords, and preparation of such a road surface can expose the laborers who lay the surface down to toxic fumes caused from the rubber. The toxic fumes are caused by the high temperature of the asphalt. Furthermore, the properties of the mixture may be inappropriate for certain end uses.

Therefore, the accumulating used rubber tires continued to be and yet are often disposed of by landfilling or littering. Such disposal methods have several key drawbacks: For one thing, a serious health risk is engendered by the tires as they can retain pools of water and are prime breeding grounds for mosquitoes. As well, the waste rubber can cause contamination of air and water supplies especially since accidental fires release highly toxic chemicals including sulfur dioxide, butadiene and vinyl cyanide gases, and leave ash residue with leachable zinc and other heavy metals. Deliberate burning to generate usable energy requires special costly scrubber systems to remove the toxic gases generated, and yet, the toxic ash remains. In addition, the sheer volume of rubber waste generated continues to strain the capacity of landfill sites. So serious are the rubber tire disposal problems that special sites and/or high disposal charges at landfills (tipping fees) are becoming the order of the day.

Accordingly, the used tires dilemma remains a significant problem of known art. See, Reisch, *Chemical & Engineering News*, May 10, 1993, pages 24–33; note, page 33.

As if the rubber disposal problem were not enough, much ado is legitimately made about the vastly enormous problems facing us in regard to the millions upon millions of tons of plastic waste generated each year. About 15 million tons (13.6 metric tons) of plastic waste is estimated to be generated each year in the U.S. alone. In addition to the plastic containers, packaging films, and other articles widely known to be a problem in many households, industrial plastic waste such as from automobile fluff, which itself contains a significant amount of rubber, factory spills of plastic resin molding beads, and so forth, contributes greatly to the sheer volume of refuse we must handle. For example, at 10 to 20 million cars and trucks discarded in the U.S. alone at about 500 pounds (230 kilograms) (ASR Clean) per vehicle the automobile fluff alone landfilled per year is about from 2.5 to 5 million tons (2.3 to 4.5 metric tons) per year. With regard to the plastics, although some recycle is done, it is not nearly enough to solve the waste problem. Virgin plastic in industrial molding is highly preferred, and a significant proportion of the plastic refuse cannot be recycled. Again, tipping fees can be daunting.

Moreover, other most serious problems which remain unsolved concern the vast amounts of cellulosic waste generated year after year. Newspapers, cardboard and sawdust represent a significant proportion of that waste. Some proposals such as making papier maches, press boards, particle boards, and other novel products such as from oxidation of some cellulosics to form an intractable mass useful for structural materials, have met with some success or promise. However, such proposals alone do not provide nearly enough outlets for recycle of the cellulosic wastes, and the commonly accepted recycle of such cellulosics such as in papers is known to cause a decrease in molecular weight in the sample and typically an inferior product or one perceived to be so. See e.g., Krulak, *The Detroit News*, Oct. 26, 1992, page 7A, "The waste of requiring paper recycling."

Further, coated cellulosics such as magazine papers represent another significant proportion of waste which is problematical to dispose of, and especially recycle or reuse. Often, such coated papers cannot be recycled with uncoated papers such as newsprint since their high quality papers may contain large amounts of clay which may cause molecular breakdowns in the paper supply. Also, the coating can interfere with reactions among cellulosics.

OBJECTS OF THE INVENTION

It is an object of the invention to provide solutions to the aforementioned problems. More particularly, an object is to provide a successful solution to the great problems from waste rubber and plastics, and to turn such waste into useful, improved and desirable products, especially within an inorganic settable material such as concrete. Another particular object is to provide added solutions to the problems of cellulosics recycle and utilization. Additional objects hereof are extant.

SUMMARY OF THE INVENTION

The present invention provides, in one aspect, a skin sulfonated rubber or plastic particle. In another aspect, a method to make said particle comprises contacting a rubber or plastic particle with a gaseous reactant containing sulfur trioxide under conditions sufficient to prepare the skin sulfonated rubber or plastic particle. In another aspect, an apparatus useful for making said particle comprises a hollow housing with upper and lower ends and an interior, a means for providing a supply of rubber or plastic particles at the upper end, said particle supply to fall through the interior of the housing toward its lower end, and a means to provide a reactant gas supply attached to the housing and in communication with the interior of the housing which is adapted to deliver reactant gas to the interior of the housing such that said particle supply falls through and contacts said gas supply. In another aspect, a composition comprises an inorganic settable, organic resin and/or cellulosic matrix in which are embedded in or form part of at least a portion of the matrix sulfonated rubber or plastic particles. In a further aspect, a method of utilization of waste rubber or plastic comprises providing a supply of waste rubber or plastic particles, contacting said supply with a gaseous reactant containing sulfur trioxide under conditions sufficient to prepare a sample containing a skin sulfonated rubber or plastic particle, and contacting said sample with an inorganic settable, organic resin and/or cellulosic fabrication composition under conditions sufficient to prepare an inorganic settable, organic resin and/or cellulosic matrix in which are embedded in or form part of at least a portion of the matrix sulfonated rubber or plastic particles from said sample.

The invention is useful in materials utilization, including in rubber and/or plastic recycle. It is useful for structural materials such as roads, buildings and housewares, and in paints.

Significantly, in satisfaction of the aforesaid objects, and even more, a tremendous outlet for waste rubber and plastics is now provided: Sulfonated rubber and/or plastic particles that can be further used to great advantage in compositions such as, for example, inorganic cements, cellulosic compositions, roofing materials, and so forth. For instance in the U.S., even the huge amount of approximately 18 million tons (16.3 metric tons) of rubber and plastic waste estimated to be generated annually is dwarfed by the amount of concrete poured annually, 400 million tons (360 metric tons), and should this waste rubber and plastic be sulfonated, even about half of the concrete poured could accommodate the utilized sulfonated waste. Most amazingly though, the properties of concrete containing the sulfonated rubber or plastic particles are dramatically improved and have greatly enhanced performance.

This improved concrete, called high performance concrete, permits the pouring of less concrete while still achieving proper performance. Thus, instead of the present 400 million tons poured annually, about 300 million tons (270 metric tons) of the high performance concrete is expected to do the job. And so, not only is a waste problem solved, the critical problem of what to do with waste rubber and plastic, but an enormous savings in the amount of concrete poured is possible.

Therefore, associated concerns are also addressed.

For example, although concrete is low cost, fuels are used in the manufacture of calcium oxide. Carbon dioxide, a greenhouse gas, is then, among other waste compounds, exhausted into the air, part of the carbon dioxide coming from the burning fuel, and part from the conversion of calcium carbonate into calcium oxide. Thus, the present invention can make a substantial contribution to a reduction of carbon dioxide pollution of the atmosphere.

The organic resin and cellulosic matrix compositions are similarly improved by sulfonated particles.

Accordingly, no longer need the vast supplies of waste rubber such as from rubber tires or of waste plastics such as from household and industrial waste be as problematical as was the case heretofore. The waste rubber, for example, need not be sorted away from rubber with reinforcing nylons and so forth, but it can be employed with the reinforcing fibers. The waste plastic need not be scrupulously cleaned if cleaned at all. Another useful outlet is provided for utilization of waste streams, not only for waste rubber and plastics, but also for cellulosics in combination with sulfonated rubber or plastics. For example, whereas recycling of waste plastics with paper labels is known to be especially difficult with known technology, with the practice of the present invention, plastics contaminated with paper can be effectively employed, particularly in the cellulosic matrix compositions.

Furthermore, the method of the invention, especially as practiced with the silo reactor apparatus of the invention, can provide abundant supplies of the value added sulfonated rubber or plastic particles at economic advantage.

Numerous further advantages attend the invention.

BRIEF DESCRIPTION OF THE DRAWINGS

The drawings form part of the specification hereof. In the drawings, like numerals refer to like features.

FIG. 1 is a schematic cross sectional view of a skin sulfonated rubber or plastic particle of the invention.

FIG. 2 is a schematic cross sectional view of a silo sulfonator reactor of the invention.

FIG. 3 is a schematic cross sectional view of a silo sulfonator reactor, with neutralizer, of the invention.

FIGS. 4A & 4B are is a schematic cross sectional views of a high performance concrete, which contains sulfonated rubber or plastic particles, of the invention, showing concrete fracture stoppage.

FIG. 5 is a schematic fanciful view of a bond theoretically between a calcium silicate network of concrete and a sulfonated rubber or plastic particle, with a sulfonate bridge.

FIGS. 6A & 6B depict a bar graph (FIG. 6B) of mortar bond pulling strengths for portland cement set on both sides of a 6 mil sulfonated polyethylene sheet (sample illustrating the invention) or a 6 mil unsulfonated polyethylene sheet (control) as depicted in FIG. 6A, with pulling apart in the directions of the arrows.

FIG. 8 is a bar graph of ASTM C-39 compressive strength results for the four light-weight concrete composites and control as depicted in FIG. 7, with units in ksi.

FIG. 9 is a bar graph of ACI 544 impact resistance results for the four light-weight concrete composites and control as depicted in FIG. 7, with units of number of blows.

FIG. 10 is a schematic fanciful view of a fiber reinforced composite, which contains sulfonated rubber or plastic particles, of the invention. This composite is not significantly pressed.

FIGS. 11A & 11B are schematic cross sectional views of roofing materials, which contain sulfonated rubber or plastic particles, of the invention.

DETAILED DESCRIPTION OF THE INVENTION

Figure 7A:
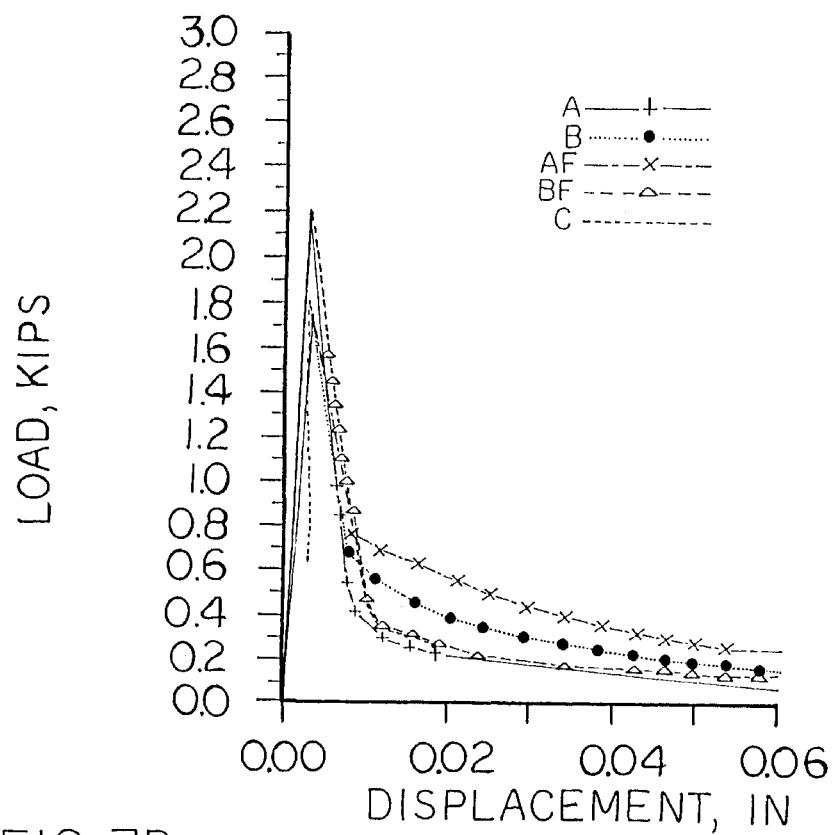
FIGS. 7A, 7B & 7C depict a set of three graphs of ASTM C-78 flexural performance results for four light-weight concrete composites of the invention (A, B, AF & BF) with control (C). These graphs represent a graph of flexural performance as a function of load vs. displacement, a bar graph of flexural strength results in units of kilograms per square inch (ksi), and a bar graph of flexural toughness in units of kilogram-inches (k-in).

Each patent or patent application cited in this specification is incorporated herein by reference.

The skin sulfonated rubber or plastic particle is a discrete rubber or plastic particle, of which an outside layer contains a high amount of sulfonic acid or sulfonate moieties. The outside layer in essence completely envelops the interior of the particle which generally is unsulfonated. The skin, or enveloping outside layer, high in sulfonic acid moieties, may range about from about 1 Angstrom (0.0001 microns) or so to about 100,000 Angstroms (10 microns) or so and typically ranges from about 10 Angstroms (0.001 microns) or so to about 10,000 Angstroms (1 micron) or so, say, approximately 500 to 5,000 Angstroms (0.05–0.5 microns) or so, more or less, in depth. The high amount of sulfonic acid or sulfonate moieties can often be, when considered as sulfonic acid functionality, estimated to be about from 0.001 to 50 milligrams (mg) per square cm of surface, preferably about from 0.01 to 5 mg per square cm of surface, and for example, approximately 0.03 mg per square cm of surface.

The best sulfonation level varies with the application.

For example, for a concrete-type application, a surface concentration with sulfonated plastics of 0.001 mg per square cm of surface is suitable. Some types of plastics sulfonate at slower rates than others, and so, in preparation of the sulfonated plastics, in order to make sure even the more difficult to sulfonate component is properly treated, a more intense level of sulfonation is generally carried out. For concrete applications, a level of 50 mg per square cm is also suitable, but is more costly in that more sulfur trioxide is generally used to reach that level.

However, for cellulosic matrix compositions, where water absorbtion is a most important property, the sulfonation level should be as low as practible. This keeps water absorbtion low. Should the sulfonation level of the sulfonated particles in the cellulosic matrices be too high, water absorbtion typically rises detrimentally.

As the particle, to start, any discrete, solid organic matter containing substance considered polymeric, and which molecules thereof can react with a sulfonating reagent to have formed the sulfonic acid or sulfonate functionality is suited for and is part of the invention. In general, sulfonatable polymers have hydrogen atoms bonded to carbon atoms which are replaceable by sulfonic acid groups. Thus, the particle can embrace discrete particles of natural rubber or synthetic rubber such as elastomers made with butadiene, and so forth, and copolymers thereof. The particle can embrace additional polymers such as polyolefins like polyethylene, linear low polyethylene, polypropylene, poly(methyl pentene), and so forth, and mixtures and copolymers thereof; vinyl polymers and copolymers like polyvinyl chloride, poly(vinylidene dichloride), polystyrene, polyacrylonitrile, poly(vinyl acetate), poly(methyl acrylate), poly(methyl methacrylate), and so forth, and mixtures and copolymers thereof; polycarbonates; polyesters like poly(ethylene therphthalate); acrylic polymers like polyacrylonitrile; polyamides like nylon 6 and nylon 66; polyurethanes; epoxies; amino resins; cellulosics; urea-formaldehyde resins; silicone polymers; plus other polymers such as polysulfones, polyimides, chlorinated polyolefins, other poly(vinylidene dichloride)-type polymers, and so forth and the like. Treated rubbers or plastic polymers, including chlorinated and partially fluorinated polymers, typically can be employed, including those disclosed among the following U.S. Pat. Nos.:

| Stock | 4,938,998 |
|---|---|
| Mehta | 4,880,675 |
| Bierschenk | 4,743,419 |
| Eschwey et al. | 4,701,290 |
| Rainville | 4,396,567 |
| Fukishima et al. | 4,394,333 |
| Rainville | 4,336,015 |
| Hawkins et al. | 3,998,180 |
| Dixon et al. | 3,862,284 |
| Joffre | 2,811,468 |
| Hofer | 1,242,189 | and so forth and the like, as well as others cited herein.

The discrete particle size may vary widely. Suitable particles as large as several inches or corresponding centimeters (cm) or more to as small as fines or dusts may be made into and become skin sulfonated rubber or plastic particles of the invention. The discrete particles may be considered substantially three dimensional, or they may be considered substantially two dimensional such as in flakes, for example, from cutting packaging films or coated papers, Typically however in substantial dimensions, the particles range about from 0.01 to 2 inches (0.025 to 5 cm) in general cross sectional distances. Advantageously, the particles range about from 0.1 to 1 inch (0.25 to 2.54 cm) in general cross sectional distances. The two dimensional particles such as made by cutting packaging films may have thicknesses typically of about 0.3 mil (0.003 inch–0.0076 cm) to about 10 mil (0.01 inch–0.025 cm). The particles may be irregularly shaped and/or have lengths and widths greater than thicknesses such as may be provided by cutting, shredding, or freeze-shattering of rubber tires, hoses or blocks, which notably can contain nylon and/or steel reinforcing fibers and be employed to advantage herein, or of a sheet or block or other sample of plastic wastes, or they may be more regularly shaped such as may be provided by reclamation of industrial plastic resin molding bead spills, rod extrusion cuttings, and so forth. Plastic coated papers such as from milk cartons and various magazines can also be cut up for a particle supply to be sulfonated. The particles may be graded as to size distribution such as from sifting, panning or screening, before or after sulfonation, but if graded, the particles are preferably graded before skin sulfonation. Industrial grading scales may be employed. A rubber or plastic particle sample may be graded, for example, to contain particles about from ⅛ to ¼ inch (0.32 to 0.64 cm) in general cross sectional distance, and, for packaging films, flakes may be graded to be about 1 mil (0.001 inch–0.0025 cm) or so thick and from about 50 mil (0.05 inch–0.13 cm) to about 500 mil (0.5 inch–1.3 cm) across.

In FIG. 1 is shown a schematic cross sectional view of a skin sulfonated rubber or plastic particle 100 of the invention. The particle 100 has unsulfonated interior 101, skin section 102 with depth 103, and the particle has cross sectional distance 104.

The skin sulfonated rubber or plastic particle can be made by contacting a rubber or plastic particle with a gaseous reactant containing sulfur trioxide. Conditions are those sufficient to prepare the skin sulfonated rubber or plastic particle.

Starting rubber and plastic particles can be initially totally unsulfonated. According to the method of the invention, the skin sulfonated rubber or plastic particles of the invention result. As well, should a surface sulfonated plastic such as an originally surface sulfonated polyolefin or polystyrene container such as made from virgin resins be chopped up to expose as new surfaces formerly internally unsulfonated plastic, according to the method of the invention such partially sulfonated particle samples can have their surface sulfonated completely to form a skin and be part of this invention. Disclosures of such sulfonated plastics may be found in the following U.S. Pat. Nos.:

| | | |
|---|---|---|
| Seizert et al. | 5,156,783 | |
| Walles | 5,030,399 | |
| Walles et al. | 4,861,250 | |
| Walles | 4,775,587 | |
| Williams et al. | 4,752,428 | |
| Walles | 4,615,914 | |
| Shefford | 4,371,574 | |
| Walles | 4,220,739 | |
| Lane | 3,947,539 | |
| Walles | 3,740,258 | |
| Caiola | 3,617,338 | |
| Walles | 3,613,957 | |
| Walles | 3,560,166 | |
| Walles | 2,937,066 | |
| Walles | 2,832,696 | |
| Walles | 2,786,780 | |
| Staudinger et al. | 2,400,720 | | and so forth and the like. Otherwise, a higher proportion of sulfonic acid or sulfonate functionality can be provided on the surface of a plastic sample having part of its surface sulfonated as aforesaid, or having internal sulfonation such as with some ion exchange resins and so forth and the like, or as, for example, disclosed by Bock et al., U.S. Pat. No. 4,220,573; Lundberg et al., U.S. Pat. No. 4,157,432; Bock et al., U.S. Pat. No. 4,014,831. Further sulfonic acid or sulfonate functionality can be provided to polymers having a surface modified with hydrogen/ammonium sulfato groups such as disclosed by Nohr et al, U.S. Pat. No. 4,666,452.

The gaseous reactant contains sulfur trioxide. Amounts and concentrations of the sulfur trioxide are those sufficient to carry out the method. The sulfur trioxide may be used alone or diluted with other gas(es) such as nitrogen, argon or air, and preferably dry air. Advantageously, the sulfur trioxide is about from 0.1 to 25 percent by volume of the reactant gas mixture containing diluent gas(es), preferably about from 0.5 to 15 percent by volume. For example, an approximately 1 to 10 percent by volume concentration of sulfur trioxide in dry air can be initially employed.

Sulfur trioxide can be supplied by a known method or process. Sulfur trioxide can be supplied from a reagent generator as of Walles et al., U.S. Pat. Nos. 4,902,493 & 4,915,912, especially for precise work. For larger scale production, the well known contact process, which involves catalytic oxidation of sulfur dioxide in air such as from burning of sulfur in air in proximity to a vanadium pentoxide catalyst over which generated sulfur dioxide passes, with temperatures of about 350 degrees C or so capable of being employed, can be advantageously used.

Temperatures of the contact between the rubber or plastic particles and the sulfur trioxide containing gas may vary. Temperatures of the contact are those sufficient to carry out the method. Generally, temperatures about from 0 to 110 degrees C, and preferably about from 20 to 80 degrees C, can be employed. The desired temperature may vary depending upon many factors, which may include the nature of the particle to be sulfonated. For example, for ¼-inch (0.64-cm) rubber particles room temperature conditions can be employed.

Pressures of the contact may vary. Pressures of the contact are those sufficient to carry out the method. In general, a moderately low or slightly elevated pressure such as about from 0.5 to 2 atmospheres is advantageously employed. Typically, the pressure employed is about normal atmospheric pressure.

Times of the contact with the reactant gas may vary, and can depend upon the concentration of sulfur trioxide, temperature, pressure, the size and type of particles, and the degree of sulfonation desired. Times of the contact are those sufficient to carry out the method. The times can be from a fraction of a second to several hours or more, say, about from 0.005 second to 2 hours, preferably about from 0.01 second to 5 minutes, desirably about from 0.05 to 10 seconds, and especially about from 0.1 to 1.5 second, for example, a time of approximately 0.2–0.3 second or so.

Produced are skin sulfonated rubber or plastic particles.

Sulfonic acid functionality can be neutralized to provide sulfonate salts. Such neutralization may be with, for example, an aqueous ammonia solution or ammonia gas to form ammonium sulfonate functionality, with a basic alkali metal or alkaline earth metal compound such as the hydroxide, carbonate, bicarbonate, and so forth, for example, with aqueous sodium hydroxide or aqueous sodium carbonate and/or bicarbonate to form sodium sulfonate functionality, with aqueous potassium hydroxide to form potassium sulfonate functionality, with an aqueous calcium hydroxide slurry to form calcium sulfonate functionality, and so forth and the like. If neutralized, moist ammonia gas is advantageously employed.

Without neutralization, the sulfonated rubber and plastic particles are hygroscopic and when leached with water yield some strong acid. The strong acid can cause metal corrosion. For an integrated industrial facility to supply the sulfonated rubber or plastic particles to concrete or into composites with cellulosics this may not be much of a concern. For example, the lime in in Portland cement has an overwhelming capacity to neutralize. Be that as it may, for bulk storage or transport, or applications in paints, and so forth, it is desirable to neutralize the sulfonated particles.

In FIGS. 2 & 3, apparatus of the invention, silo particle sulfonators 200, are depicted. Preferably, sulfonation and optional neutralization of rubber or plastic particles is carried out in such apparatus. It can produce highly superior products, in comparison to sulfonated products produced by batch methods, where contact times are as a minimum on the order of minutes, and partially grossly over sulfonated product together with low or unsulfonated particles results inside inevitable clusters.

Silo particle sulfonator 200 is useful for making the skin sulfonated rubber or plastic particle. It has hollow imperforate housing 201 made of a generally inert material such as stainless steel, e.g., 316SS, or glass, for example, the 316SS, which has an upper end 202, a lower end 203 and an interior 204. The interior of the sulfonator is made, for example, of stainless steel. Length 205 generally defines a vertical height of housing interior, and may be any suitable distance, typically about from 1 to 8 feet (0.305 to 2.45 meters (m)), to include about from 2 to 6 feet (0.61 to 1.83 m), for example, approximately 3½ feet (1.07 m). Width 206 generally defines a horizontal width of housing interior, and may be any suitable distance, typically about from 1 inch to 3½ feet (2.54 cm to 1.07 m), to include about from 3 inches to 2½ feet (7.62 cm to 0.76 m), for example, approximately 10 inches (25 cm). The sulfonator 200 may have baffles 207 in its housing interior. The silo particle sulfonator may take any suitable cross sectional form such as a vertically oriented circle, i.e., thus forming a cylinder; it may be a cone, or an elliptical cylinder; it may have an octagonal, square, rectangular, trapezoidal, trapezium, or triangular cross section, and so forth and the like. For example, silo particle sulfonator 200 (FIG. 2) has a generally cylindrical tubular housing.

Means 210 for providing a supply of particles, preferably, rubber or plastic particles, is connectable at the upper end of sulfonator 200. The means 210 may embrace a hollow delivery channel 211 having an interior delivery screw 212, which feeds particles to the interior of the sulfonator housing proximate to the upper end of the housing, as supplied from a hopper 213. The delivery screw may be powered by an engine or motor 214, for example, a ¼-horsepower (190 joules/second) 90 Volt DC electric motor, controlled by SCR control, adjustable, with current limit. Larger motors may be employed to fit larger set ups. Particle supply 49, which preferably has fines absent therefrom or, if present, present at a low level, falls through the interior of the housing toward the lower end, as by the force of gravity.

Means 220 to provide a reactant gas supply to the sulfonator 200, preferably a gas containing sulfur trioxide such as can be provided by a gas sulfonator as of the patent to Walles et al., U.S. Pat. No. 4,915,912, or by the contact process, and so forth, is attachable to the housing, as through hollow delivery line 221. The means 220, via line 221, is in communication with the interior of the housing, as through delivery line coupling 222, and the means 220 is adapted to deliver reactant gas to the interior of the housing thereby. Preferably, delivery line 221 is fixed to the housing below hollow exit line 223, which takes up gas from the interior of the housing as it, too, is in communication with the interior of the housing, as through exit line coupling 224. Dust trap 225 may be present to remove fines so as to avoid fouling, or clogging the lines or workings of, the reactant gas generator. Flow control valves 226 may be present.

Means 230 to regulate product flow may be present by lower end 203 of the sulfonator 200. The means 230 can have large upper flow control valve 231, momentary storage receptacle 232, which is preferably imperforate, and large lower flow control valve 233. The valves 231 & 233 may be in a simple form a slidable plate made of metal such as, for example, of the 316SS, with a hole therein, which is slid back and forth to open and close flow thereat, as appropriate. A valve sequence controller 234 with product level detector may regulate the opening and closing sequences of the upper and lower flow control valves 231 & 233 so as to produce an air lock effect. When the storage receptacle 232 is to be filled, the upper flow control valve 231 is opened, and the lower flow control valve 233 is closed. Next, the upper flow control valve 231 is closed, and the lower flow control valve is opened, which releases stored product to receptacle 23 below. In turn, the sequence can be repeated. Preferably, at least one of the large flow control valves 231 & 233 are kept closed during the sequence. In addition, a slight delay, where product resides in the momentary storage receptacle 232 while both large flow control valves 231 & 233 are closed, may be employed to use up residual reactant gas in an imperforate storage receptacle 232 from continued contact with the rubber or plastic particles.

Silo particle sulfonator 200 may have optional section 240 for neutralization attachable thereto. It may have upper control valve 241, upper chamber 242, middle control valve 243, middle chamber 244, lower control valve 245, and neutralization chamber interior 246. Neutralizing medium 00, for example, moist ammonia gas in air, enters through delivery line 247, and an exit line 248 is provided. Concentrations of the moist ammonia gas in air mixture can generally include those such as follows, wherein general percents are given by volume:

|  | Ammonia (%) | Air (%) | Water (%) |
|---|---|---|---|
| Typically | 1–100 | 1–99 | 0.01–10 |
| Preferred | 3–10 | 90–97 | 0.1–1 |
| Exemplary | 4–5 | 95–96 | 0.2–0.5 | and so forth and the like. Alternatively, liquid neutralization medium apparatus such as a tank or spray device (not illustrated) may be employed to neutralize sulfonated particles if desired. In use, the particle supply 49 enters the interior of the housing, falls therethrough, and contacts gas supply 51 and/or gas supply 00 delivered therein, reacts with the reactant gas(es), and becomes reacted product particle 100. Free falling of 3 to 4 feet (approximately 1 m) through an initial 5 to 10 percent by volume sulfur trioxide in dry air mixture as the gas supply 51 is sufficient, for example, to provide full water wettability and concrete adhesion for the rubber or plastic particle supply. Reactant gas(es) amount or concentration decreases or is used up in the housing interior by the particle contact from delivery line 221 to exit line 223, and/or from delivery line 247 to exit line 248. As an illustrative example, a 5 percent sulfur trioxide in dry air mixture may be delivered to contact falling rubber or plastic particles, with a 1 percent sulfur trioxide in air mixture exiting. The exiting reactant gas(es) may be recycled, and as with sulfur trioxide and/or ammonia, preferably are recycled. Typically, little if any reactant gas(es) escape by lower end 230, especially if sequentially operated end valves are employed. Accordingly, the apparatus of the invention differs notably from such art as that disclosed in the following U.S. Pat. Nos.:

| Nishi et al. | 4,818,511 |
|---|---|
| Sear | 4,125,578 |
| Alagy et al. | 3,846,079 |
| Evans et al. | 3,844,251 |
| Zirngibl | 3,129,063 |
| Steuber | 2,935,372 |
| Luntz et al. | 2,768,199 |
| Bethea | 2,676,909 |
| Royster | 2,670,946 |
| Newton | 2,538,030 |
| McCallum et al. | 2,058,480 |
| Siems | 1,941,499 |
| Hirsching | 365,746 | and so forth and the like.

The sulfonated particles 100 which result from employment of the sulfonator 200 are decidedly superior in such characteristics as uniformity of sulfonation from particle to particle, and in degree of sulfonation, among other characteristics. The degree of sulfonation can be varied as desired based upon several factors to include length of free fall through the reactant gas, concentration of the reactant gas sulfur trioxide, and so forth. Any neutralization carried out can be controlled to the point of complete neutralization by control of similar suitable parameters.

The present sulfonation technology opens up the possibility for large scale utilization from waste or product streams such as the following:

A) Shredded trees as used to make pressed hardboard.
B) Paper waste, both sulfonated and as matrix.
C) Plastic waste, especially as sulfonated particles.
D) Rubber waste, especially as sulfonated tire particles.
E) Glass, especially as a filler or as reinforcing fiber.

The sulfonated particles can be employed to advantage in various compositions. For instance, one such composition contains an inorganic settable, organic resin and/or cellulosics matrix in which are embedded in at least a part of the matrix sulfonated rubber or plastic particles.

Thus, the sulfonated particles are quite versatile in use. Some properties of the sulfonated rubber particles, in particular to include those which are skin sulfonated, which corresponding unsulfonated rubber particles do not have, include the following:

A) When incorporated into a matrix such as of concrete, a reduction of shrinkage cracks typically results, and they are capable of absorbing fracture energy, which results in the dead-ending of cracks, providing a high performance composition. For example, city sidewalks are often six inches (15.2 cm) thick; by employing a high performance concrete containing about from 5 to 10 percent by volume sulfonated rubber particles as from shredded rubber tires, a reduced thickness sidewalk can be poured. Typically, a 4-inch (7.6-cm) high performance concrete sidewalk as this performs as well or better than a 6-inch (15.2-cm) thick concrete sidewalk without the sulfonated rubber particles. This is especially true with low weight cinder blocks.

B) Formation of direct chemical bonds between rubber and matrix materials, for an example, the calcium silicate of a Portland cement containing concrete.

C) Elimination of persistent air bubbles that cling to rubber particles, which would weaken whatever is made with them.

D) Non-clumping of rubber particles due to static electricity as sulfonated particles are antistatic.

E) Bondable to many organic resins, for a few examples, epoxy and polyurethane resin systems due to direct covalent chemical bonds provided from the sulfonate skin.

F) When incorporated with cellulosic compositions, the lack of clumping and lack of air bubbles around the particles make for a strong composite.

Plastic particles with a sulfonated skin have these advantageous properties over their unsulfonated counterparts as well.

The inorganic settable matrix component can include such as calcium-silicate cements like Portland type cements; calcium sulfate-containing cements like Plaster of Paris, gypsum cements, anhydrite, and so forth; phosphate-based cements; aluminous cements; magnesium oxy chlorite type cements like Sorel type cements; and so forth. Additives such as proteins, organic resins, inorganic aggregates, setting accelerators and/or inhibitors, and so forth and the like can be included. Preferably, a calcium-silicate cement, for example, Portland cement, is employed. The inorganic settable, e.g., concrete, composition can be of normal weight or be lightweight.

In particular, with sulfonated rubber and/or plastic particles employed within a concrete matrix, optionally with glass as well, concrete typically shows significantly higher toughness, tensile strength, frost resistance, fracture resistance, and so forth. Recycled rubber and plastic is advantageously employed.

The organic resin matrix, which may be referred to as a binder, can include polyurethanes, epoxies, urea-formaldehyde resins, thermoplastics to include, for example, polyethylene, polypropylene, polyvinyl chloride, lignin, and the aforesaid polymers which may be employed for sulfonation herein.

The cellulosics matrix can be a simple cellulosic fiber material such as shredded whole tree pulp, wood pulp, fiber slurry, and so forth, to which the sulfonated rubber and/or plastic particles are added, which may be pressed into a mat or hardboard type article to provide an enhanced composition. Binder(s) such as from glues, phenol formaldehyde resins, phenolic resins, and so forth and the like, may be present with such a cellulosics matrix, but are often not required or desired when the sulfonated particles are employed.

A most advantageous utilization matrix can be prepared from the wet cellulosics fabrication compositions of Rudy, U.S. Pat. No. 4,496,718 and pending U.S. patent application Ser. No. 08/039,509 filed on Mar. 29, 1993, now U.S. Pat. No. 5,348,621 with the addition of the sulfonated rubber or plastic particles. These fabrication compositions are formed into an intractable cellulosic polymeric mass, actually increasing molecular weight of newsprint, kraft paper, and cardboard fibers, by the action of an oxidizing agent such as bleach, ozone, chlorine, bromine, and peroxides such as hydrogen peroxide. The compositions produced are highly desirable, for example, as structural materials, and serve to provide value added utilization of waste materials recovered from two separate significant waste streams.

The inorganic settable, organic resin and cellulosics matrix components can be used alone or together, as appropriate.

Fiber components can be added, or may already be present in the sulfonated rubber or plastic particles. Such fibers include mineral fibers such as asbestos, glass, and so forth; plant fibers such as from wood, flax, hemp, cotton, and so forth; paper fibers; metal fibers including steel as found in rubber tires, and elsewhere, and so forth; organic materials and textiles including nylons and polyesters as found in rubber tires, and elsewhere, rayon, orlon, polyethylene, polypropylene, and so forth and the like. Preferably, nylon and polyester.

Filler components can be added such as chunks of thermoset polymers, ground or pulverized wastes, gravels, sands, clays, diatamaceous earth, dusts including kiln and flue dusts, brick culls, slates, glass, slags, metal chunks, and so forth and the like. Preferably, sand, sharp edged types, are employed.

The compositions can be made with the sulfonated rubber or plastic particles by adding the particles to a suitable fabrication composition and curing as may be desired. Highly enhanced performance products can result.

Amounts of the sulfonated rubber and/or plastic particles in the matrix components are those which can prepare a useful composition. These may include percents by weight such as follows:

|  | Generally | Typically | Preferably |
| --- | --- | --- | --- |
| Inorganic Settable (IS) | 0.5–60 | 1–20 | 2–8 |
| Organic Resin (OR) | 1–90 | 1–40 | 2–20 |
| Cellulosic (C) | 1–90 | 5–75 | 20–70 |
| IS + OR + C | 1–90 | 3–60 | 3–15 |
| IS + OR | 1–90 | 3–60 | 3–15 |
| IS + C | 1–90 | 3–75 | 3–20 |
| OR + C | 1–90 | 1–50 | 2–30 |

Preferably in particular, cellulosics are heated to about from 100 to 180 degrees C., and are simultaneously pressed.

Note that if the composite is heat-pressed, the sulfonated skin may rupture or be deformed. This typically is no cause for concern, as the particle has done its duty during a desired slurry phase.

In FIG. 4 is depicted a schematic cross sectional views of a high performance concrete 500 of the invention. The concrete has coarse aggregate 37. It also has sulfonated rubber or plastic particles 100, which stop cracks or fractures 52 by dead-ending or deflecting them. Thus, the sulfonated rubber or plastic particles may be considered to absorb fracture energy. In addition, these particles can bridge cracks to improve concrete performance. In contrast, concrete without the sulfonated rubber or plastic particles fractures much more extensively.

In FIG. 5 is depicted a schematic fanciful view of a bond proposed to exist between the calcium silicate network of concrete 53 and a sulfonated rubber or plastic particle 100. A sulfonate bridge 443 is part of the bond.

In FIG. 6 is depicted a bar graph of mortar bond pulling strengths in units of pound per square inch, i.e., "psi," for Portland cement set between either a 6 mil sulfonated polyethylene sheet, i.e., sample 500, or a 6 mil unsulfonated polyethylene sheet (control) as depicted in the figure inset. Units of psi can be converted into metric units: 70.3 grams per square cm=1 psi.

Figure 7B:
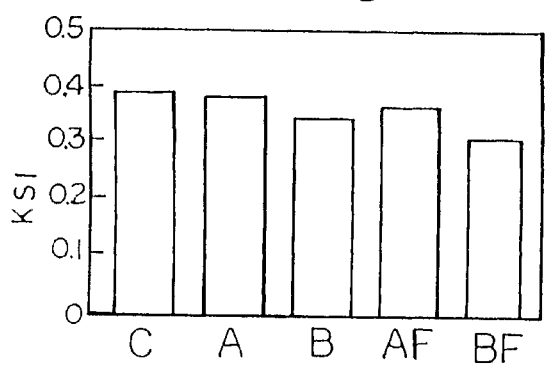
Figure 7C:
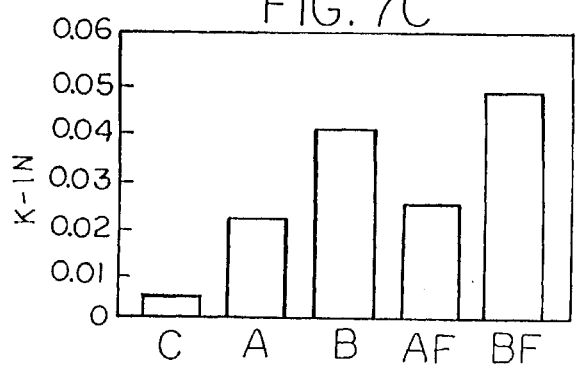

In FIGS. 7–9 are depicted test results for light-weight concrete samples, and a control.

In FIG. 10 is depicted a schematic fanciful magnified and partially expanded view of a fiber reinforced composite 510. The composite is a sulfonated rubber or plastic particle 100 as an organic binder with nylon fibril 61, and glass, metal and/or organic material reinforcing fibers 62. Such fiber reinforced composites can be derived from mostly waste materials, by means of sulfonation of plastics, rubber or cellulosics, followed by a slurry process. Filler 63 may be present. Such fibers as wood and paper, to include coated magazine papers, especially if sulfonated, steel to include from tires, nylon to include from tires, and polyester to include from tires, are desirably employed. Such binders as sulfonated, especially the skin sulfonated, coated papers, thermoplastics, polyethylene, polypropylene, polyvinyl chloride, curbside waste, lignin and so forth are desirably employed. Such fillers as unsulfonated thermosets, sand, clay, glass, and so forth, and preferably sand, clay and/or glass, can be employed as desired.

In FIG. 11 is depicted a schematic cross sectional view of roofing material composites 520 & 521. These composites contain sulfonated rubber or plastic particles 100, a binder 70, and roofing base 71 such as plywood, chipboard, planks, concrete, and so forth. The binder can be, for example, a water based binder such as of a poly(ethylene acrylic acid) ammonium dispersion in water, or it can be an asphalt emulsion. Composite 520 can be made by spreading the binder on the roofing base, adding the sulfonated rubber or plastic particles thereto, and letting the composite cure as may be desired. Composite 521 can be made by slurrying the sulfonated rubber or plastic particles in the binder, spreading the slurry on the roofing base, and letting the composite cure as may be desired.

Although skin sulfonated rubber or plastic particles are depicted in the embodiments of FIGS. 4, 10 & 11, and their use is preferred, especially from recycle streams, it is not necessary to employ the skin sulfonated rubber or plastic particles of the invention to make such composites to be of the invention. Rubber or plastic particles which are partially but substantially sulfonated or completely sulfonated throughout, for example, may be employed in such composites of the invention.

Advantageously, utilization of waste rubber or plastic can be carried out. A supply of waste rubber or plastic particles is contacted with a gaseous reactant containing sulfur trioxide under conditions sufficient to prepare a sample containing a skin sulfonated rubber or plastic particle. In the sample, other sulfonated particles, e.g., internally sulfonated polystyrene plastics, may be present as well. The sample is contacted with the inorganic settable or organic resin fabrication composition. Conditions are those sufficient to prepare an inorganic settable or organic resin matrix, and in the matrix are embedded at least in part sulfonated rubber or plastic particles from said sample. Preferably, skin sulfonated rubber or plastic particles are present to a substantial degree.

The products of the invention differ notably from such products as disclosed, for example, by the following patents:

| | |
|---|---|
| Sear | U.S. Pat. No. 4,125,578 |
| Murray | U.S. Pat. No. 4,093,690 |
| Mallonee | U.S. Pat. No. 3,556,895 |
| Lilienfeld | U.S. Pat. No. 1,881,742 |
| Sprunger | U.S. Pat. No. 1,864,621 |
| Meade | U.S. Pat. No. 1,479,394 |
| Waite | U.S. Pat. No. 759,332 |
| Harris (Monsanto) | Cdn. 896,627 | and as well, the composites of the invention differ notably from such disclosures as, for example, of the following U.S. Pat. Nos.:

| | |
|---|---|
| Sanchez | 5,112,405 |
| Furuhashi et al. | 4,936,918 |
| Restrepo | 4,407,676 |
| Kazama et al. | 4,345,944 |
| Dudley et al. | 4,293,341 |
| Ball et al. | 4,032,353 |
| Schaupp | 3,997,502 |
| Hohwiller et al. | 3,732,791 |
| Nishi et al. | 3,677,780 |
| Towner | 3,577,893 |
| Buckley et al. | 2,483,806 |
| Tucker | 1,972,208 |
| Tucker | 1,972,207 |
| Bond | 1,940,528 |
| Gallinowsky | 500,485 |
| Bailey | 200,122 | and so forth and the like.

The following examples further illustrate the invention.

EXAMPLE 1

A sample of shredded rubber tires, with nylon, polyester and/or steel cords, and having a bulk density of about 23 pounds per cubic foot (0.37 grams per cubic cm (g/ccm)) and an ASTM D 422 particle size distribution about as follows:

| Sieve Size | Percent Retaining | Percent Passing |
|---|---|---|
| #4 | 0.0 | 100.0 |
| #8 | 2.0 | 98.0 |
| #10 | 12.6 | 85.4 |
| #16 | 42.6 | 42.8 |
| #30 | 28.3 | 14.4 |
| #40 | 6.9 | 7.5 |
| #50 | 4.2 | 3.3 |
| #100 | 2.8 | 0.6 |
| >#100 | — | 0.1 | is sulfonated through a free fall of 3–4 feet (ca. 1 m) by a 5 percent by volume sulfur trioxide in dry air mixture in a silo sulfonator of the invention. A skin sulfonated rubber particle sample results. Proper sulfonation is demonstrated by simply observing a sample of the sulfonated rubber particles as is added to water: All of this sample wets and sinks uniformly, and it is easily dispersed with no clusters.

In contrast, unsulfonated rubber particle control shows a substantial part of the finer particles floating on water, not wetting. The larger particles with larger air bubbles float as well. Some particles are observed to sink but have a smaller air bubble. Clusters are evident.

The sulfonated rubber sample has about 0.03 mg of sulfonate functionality per square cm according to acid-base titration. Its bulk density is substantially unchanged.

EXAMPLE 2

Sulfonated rubber particles as from Example 1 are neutralized with ammonia. The particles are substantially non-hygroscopic.

EXAMPLE 3

The following three plastic particle samples are sulfonated as in Example 1: A) No. 2 post consumer waste; B) No. 2 post consumer waste with some post industrial waste; C) Nos. 3, 4+5, 6 & 7 post consumer low density polyethylene and polystyrene, waste. These three samples provide skin sulfonated plastics, as does the rubber particles of Example 1. Sulfonation is made visible by exposing the sulfonated plastic to 0.1 percent by weight crystal violet dye in water, which is followed by rinsing. The sulfonated particles are distinctly colored blue/violet as the basic dye sticks to sulfonate groups, whereas unsulfonated particles exposed to the same dying conditions do not pick up dye or very little of it. This dye is a practical, quick way to verify proper sulfonation.

EXAMPLE 4

A waste plastic fraction is obtained (People's Garbage, Bridgeport, Mich.) which otherwise would be destined for dumping in a landfill. The plastic waste is characterized as originating from mostly municipal waste which is collected from curbside, but of this waste, polyethylene milk bottles are previously presorted away for separate recycle. The remainder is mostly detergent bottles of various colors. The composition of the fraction which is obtained is variable. Upon grinding, visual examination shows that plastic pieces from about ⅛ of an inch (0.31 cm) to about ¼ of an inch (0.62 cm) represent approximately 95 percent of the size distribution of the sample which is ground up to include into jagged pieces. The jagged pieces with a pink-like color apparently result from the household detergent bottles and caps. Another identifyable fraction of plastic pieces are rounded colorless pellets with the consistency of industrial pellets as are used for molding.

Sulfonation is carried out by placing the sample in a hopper leading to a continuous screw feeder, from which the particles fall into an approximately 4-foot (1.2 m) long stainless steel cylinder portion of a silo sulfonater. The cylinder interior is outfitted with a series of baffles to increase the exposure time to the reactant gas containing sulfur trioxide, in this case about 9.5 percent by volume sulfur trioxide in dry air. The gas is supplied and recycled by the aforesaid sulfur trioxide generator with recycler of Walles et al., U.S. Pat. No. 4,915,912. A contact time of about from 0.2 to 1 second is estimated. See, FIG. 2.

Upon sulfonation, the sulfonated waste plastic particles are neutralized in 3 percent by weight (wt %) ammonia in water solution. The ammonium sulfonate containing particles are dried.

EXAMPLE 5

To samples of a Portland cement concrete (QUICKRETE No. 1011) are added sulfonated rubber particles such as of Example 1, and to three times as many additional samples of the same type of concrete are respectively added the three types of sulfonated plastic particles such as of Example 3. Samples are made of each set, plus a control without sulfonated particles and a comparative with unsulfonated rubber or plastic particles, respectively, each using 12 wt % water in comparison to 88 wt % remaining components. For both rubber and plastic particles, two sets have 5 wt % sulfonated particles; one set has 10 wt % sulfonated particles; one set (control) has 0 wt % added sulfonated or unsulfonated rubber or plastic particles; one set (comparative) has 10 wt % unsulfonated rubber or plastic particles. Samples are cured for 28 days before testing.

In each sample set of the invention the sulfonated particles cannot be easily removed by pulling them out with a tweezer at a surface including on the plane of a cut through the sample with a water lubricated circular saw. In contrast, the unsulfonated rubber or plastic particles can be removed with a tweezer.

The concrete compositions of the invention are fracture resistant with dead-ending of induced fractures in the particles. Microphotographs provide the evidence.

In addition, a variety of tests, including resistance to blows, flexural strength, and so forth and the like, show substantial improvement to the concrete with the addition of the sulfonated rubber particles. Thus, the name, "high performance concrete," is justified.

See, FIGS. 4–6.

EXAMPLE 6

A concrete sample containing 3 wt % sulfonated waste plastic particles is poured in a circular disc 1½ inches (3.8 cm) thick and 1½ inches (3.8 cm) wide around the outside of a 2-inch (5.1 cm) steel tube, and is cured. Upon curing shrinkage cracks are not observed.

In contrast, a control, i.e., the same concrete but without waste plastic particles, upon being poured and cured in the same manner, shows multiple shrinkage cracks. These cracks typically radiate in a direction from the center of the sample toward its circumference, and widen near the circumference.

Accordingly, by using sulfonated particles in concrete, up to half of the total concrete poured in critical applications, where shrink-cracking must be avoided, can be saved.

EXAMPLE 7

Light-weight sulfonated plastic particle containing concrete samples are made, as follows: A sample of recycled high-density polyethylene (HDPE) particles, which are generally flat and ⅜-inch (~10 mm) in diameter, are skin sulfonated (SS) in a silo reactor such as employed in Example 4 to provide a SSHDPE particle sample. The SSHDPE particles generally replace 20 & 40 percent sand (samples A & B) and a part coarse aggregate (Coarse) in known air-entrained, light-weight concrete. A control (C) is made with all sand. A series of 1.5-inch (3.8 cm) slump concretes are prepared with the following proportions:

|   | Cement | Coarse | Sand | SSHDPE | Water | Air Entraining Agent |
|---|--------|--------|------|--------|-------|----------------------|
| A | 750 | 180 | 719 | 120 | 698 | 0.06 wt % of cement |
| B | 750 | 193 | 579 | 258 | 638 | 0.06 wt % of cement |
| C | 750 | 170 | 850 | — | 735 | 0.06 wt % of cement |

Another set of samples of 1.5-inch-slump is made like samples A & B except that 10 wt % fly ash is added in place of sand, and these are samples AF & BF, respectively. The fresh mix unit weight (ASTM C-642), flexural performance (ASTM C-78), compressive strength (ASTM C-39) and impact resistance (ACI 544) of each sample and control is observed, as follows:

|    | ASTM C-642 | ASTM C-78 | ASTM C-39 | ACI 544 |
|----|------------|-----------|-----------|---------|
| A  | 1.45 | See FIG. 7 | See FIG. 8 | See FIG. 9 |
| B  | 1.35 | See FIG. 7 | See FIG. 8 | See FIG. 9 |
| AF | 1.50 | See FIG. 7 | See FIG. 8 | See FIG. 9 |
| BF |      | See FIG. 7 | See FIG. 8 | See FIG. 9 |
| C  | 1.50 | See FIG. 7 | See FIG. 8 | See FIG. 9 |

Flexural performance toughness results are singularly impressive.

EXAMPLE 8

Neutralized sulfonated rubber particles as from Example 2 are added to the B-side (polyol side) of a polyurethane fabrication composition. The B-side is thoroughly mixed and is added to a polyurethane reactant A-side (isocyanate side) by conventional methods, and the A-B mixture is allowed to cure. A nice polyurethane composition results which imbeds the particles.

EXAMPLE 9

A 50/50 mixture by weight of neutralized sulfonated plastic particles from Example 4 and epoxy are made with 25 wt % hardner, 25 wt % resin, and 50 wt % particles. A comparative of the same waste plastic particles, but without having been treated by sulfonation, and the same epoxy reactants, is also made.

Upon curing, the filled epoxy samples are smashed with a hammer. The epoxy composition containing the neutralized sulfonated plastic particles adhere strongly to the epoxy matrix, whereas the untreated plastic particles do not adhere.

Accordingly, for practical applications such as bridge decks made with expensive epoxy resin, the sulfonated waste plastic can serve in two significant capacities. One, it can serve as a filler to save high-cost epoxy fabrication components, and two, it can serve to strengthen the matrix by dead-ending starting cracks in, and bridging over cracks of, the epoxy matrix.

EXAMPLE 10

Michigan hard wood pulp (Abitibi-Price, Alpena) and sulfonated waste polypropylene powder (which is obtained from the glass fiber filled polypropylene automotive plastic process) as prepared by Example 3 are prepared into about 20 to 50 gram discs (10 cm diameter×3 to 7 mm thickness) by mixing the pulp and the skin sulfonated polypropylene (SSPP) in a water slurry, pressing in a cylindrical screw press, heating in an oven to about 150 to 180 degrees C, cooling to about room temperature or a temperature safe to handle by hand, and removing from the press. The following results, with controls (C), are obtained:

| Sample | Wt % Pulp | Wt % SSPP | *Water Absorbency | Density |
|--------|-----------|-----------|-------------------|---------|
| C-Pulp | 100 | 0 | 58 wt % in 24 hrs | 0.53 g/ccm |
| W-1 | 75 | 25 | 17 wt % in 24 hrs | 0.62 g/ccm |
| W-2 | 50 | 50 | 9.9 wt % in 24 hrs | 0.53 g/ccm |
| W-3 | 25 | 75 | 7.5 wt % in 24 hrs | 0.64 g/ccm |
| C-SSPP | 0 | 100 | 0.5 wt % in 24 hrs | 0.9 g/ccm |

*As determined by immersing the disc in water at room temperature for 24 hours, removing surface water with a towel, and weighing the disc. The weight is compared with that of the same disc before immersion and is listed as wt % gain over starting weight.

Accordingly, pressed boards with less than 10 wt % water absorbency are thus prepared, typically with a minimum of about from 30 to 50 wt % of the sulfonated plastic, e.g., SSPP, therein. The pressed boards having less than 10 wt % water absorbtion are dimensionally stable when used in bathrooms and other places where they occasionally get wet. Absorbtion greater than about 10 wt % results in buckling when wet. This buckling becomes permanent upon drying, which is unacceptable for more demanding, higher valued applications.

As the sulfonation prevents air bubbles from remaining on the plastic particles, when the sulfonated particles, e.g., SSPP, are introduced in a water slurry, clumping is prevented, and rapid mixing with the other slurry components is engendered. During heating and pressing, the sulfonated skin often breaks, and molten plastic flows between the fibers and helps bind the mass together. In this case, the particles lose their discrete identity and thus, the sulfonated particles are a functional intermediate during the first few steps of such a production process. And so, a stronger, better looking product is produced.

See, FIG. 10.

In contrast, from 2–10 wt % of expensive phenol formaldehyde resin is otherwise used with the pulp to prepare a standard product having a 24 hour water absorbency of 1–15 wt %.

In further contrast, the polypropylene of this example is deliberately oversulfonated by exposing it for 30 minutes to 6 percent by volume sulfur trioxide in dry air in a resin flask, with mild agitation, to provide polyproprylene particles with a sulfonation level of 30 mg per square cm. Upon neutralization as in this example above, slurrying with such components as above, pressing and drying, these oversulfonated samples absorb more water than the control.

The latter routine shows that for wood composites, oversulfonation of rubber or plastic particles is detrimental. However, oversulfonation is not, detrimental for concrete, where a large excess of calcium hydroxide creates insoluble calcium sulfonate with contact with the sulfonate groups.

EXAMPLE 11

To a slurry of skin sulfonated (SS) waste polypropylene and newsprint otherwise as of Example 10 is added 10 percent by volume of common household, i.e., 5 wt % aqueous sodium hypochlorite bleach. The slurry is mixed further, is sieved, and is pressed and dried as in Example 10. Controls (without plastic particles) and comparatives (with unsulfonated waste polypropylene particles) are likewise prepared. The bleach acts as explained by Rudy, U.S. Pat. No. 4,496,718. It converts part of the newspaper to a thermosetting matrix which is resistant to boiling water. Sulfonation prevents air entrainment around the particles and prevents clumping. The result is a generally stronger, more dense composite.

EXAMPLE 12

Sulfonated rubber particles as from Example 1 are neutralized with a dilute aqueous ammonia solution. A pure white latex paint (Glidden Eggshell Latex Paint) has 22 wt % of the neutralized sulfonated rubber particles stirred uniformly in it, and the paint composition is applied to a small piece of oak plywood and dried in an oven at 55 degrees C. An attractive textured paint results. The height between low and high spots in the paint is about 2 to 3 millimeters (mm), about the size of the sulfonated rubber particles added. The textured paint overall has a uniform white appearance, and when the textured paint has its surface roughened with a screwdriver the paint remains quite essentially white, which shows that the sulfonated rubber particles adhere to the latex matrix.

In contrast, if the particles are unsulfonated, an off white paint results. When a screwdriver is used to rough up the paint surface of that paint, untreated rubber particles come off, and the paint is made black in places.

See, FIG. 11.

EXAMPLE 13

To a water dispersion of poly(ethylene-acrylic acid) ammonium salt as binder, a so-called binder dispersion (BD), is added skin sulfonated waste rubber particles (SSRWP) from shredded tires having as dispersion such as in Example 1 to form a water dispersion. The mixture is stirred well and coated on roofing plywood sheets. It can be dried at room temperature with good results but is dried faster at 50 to 80 degrees C. Ammonia gas is released. The composition dries to contain in the binder part about 80 wt % polyethylene and 20 wt % polyacrylic acid copolymer binder, becomes insoluble to water, binds well to the plywood, and has excellent sunlight stability. The following compositions are provided, with comparative (COMP) having unsulfonated rubber particles. The following is observed:

| Sample | Wt % BD | SSRWP | Observation |
|---|---|---|---|
| W-1 | 70 | 30 wt % | Strongly bonded by excess binder |
| W-2 | 50 | 50 wt % | Strongly bonded by desired level of binder |
| W-3 | 10 | 90 wt % | Bonded, barely enough binder to hold SSRWP tight under adverse mechanical conditions |
| COMP | 50 | 50 wt % | Rubber particles easily dislodged, and roof coating performance is unattractive. |

Alternatively, the water binder dispersion is spread on the roofing substrate of plywood, and the particles are sprinkled over the spread dispersion and pushed in. The composition is allowed to dry. The roof coating is functional, but more binder is required than for premixed coating.

See, FIG. 11.

This roof coating can be compared against nailing onto the roofing plywood or chipboard, the well known apshalt shingles. The shingles perform well, but take much more labor and precision positioning to align the shingles.

On the other hand, the roofing composite of this example can be spread over the roofing plywood or chipboard without nailing and without worrying about alignment of rows of shingles. It is advantageous to let sunshine dry the applied binder system or use a hot air gun, as rain would wash away uncured roofing composite.

CONCLUSION

The present invention is thus provided. Numerous adaptations and modifications can be effected within its spirit, the literal claim scope of which is pointed out as follows:

We claim:

1. A filled composition comprising a product prepared by curing a matrix selected from the group consisting of inorganic settable, organic resin, and cellulosic matrices, and combinations thereof, wherein the inorganic settable matrix is selected from the group consisting of a calcium-silicate cement, a calcium sulfate-containing cement, a phosphate-based cement, an aluminous cement, a magnesium oxy chlorite type cement, and combinations thereof;

the organic resin matrix is selected from the group consisting of an epoxy, a urethane, a urea-formaldehyde resin, a lignin, a binder made from a water based paint or roofing composition, or an asphalt emulsion, and combinations thereof; and the cellulosic matrix is selected from the group consisting of a simple cellulosic fiber material made from a slurry, and an intractable cellulosic polymeric mass made from action of an oxidizing agent on a wet cellulosics fabrication composition;

in at least a portion of which matrix is embedded skin sulfonated particles having a surface layer and an interior, wherein the surface layer of the particles is sulfonated and the interior of the particles is essentially not sulfonated, present as an aggregate initially before any heating or pressing processing, present finally as a particle or solid residue thereof in the matrix and not in liquid solution, of a discrete, solid, organic matter containing, polymeric substance, provided that if said particles are of plastic, a substantial amount of the skin sulfonated plastic particles are at least about 0.1 inch in general cross sectional distance in two dimensions, and at least about about 0.003 inch in thickness.

2. The composition of claim 1, which contains the inorganic settable matrix, and wherein the skin sulfonated particles are present finally as solid aggregate particles.

3. The composition of claim 2, which is a filled composition of a high performance concrete containing a Portland cement, wherein said skin sulfonated particles are present finally as solid aggregate skin sulfonated particles, said particles being selected from the group consisting of rubber, plastic and a combination thereof, embedded in at least a portion of a matrix containing the Portland cement.

4. The composition of claim 1, which contains the organic resin matrix, and wherein the skin sulfonated particles are present finally as solid aggregate particles.

5. The composition of claim 4, which can function as a roofing composition, and which contains skin sulfonated shredded rubber particles and a binder system, which becomes resistant to water upon drying.

6. The composition of claim 5, wherein the binder system contains a poly(ethylene-coacrylic acid) ammonium salt.

7. The composition of claim 1, which contains the cellulosic matrix.

8. The composition of claim 3, which contains the skin sulfonated rubber particles, present in an amount about from 1 to 20 percent by weight of the matrix components.

9. The composition of claim 3, which contains the skin sulfonated plastic particles, present in an amount about from 2 to 8 percent by weight of the matrix components.

10. The composition of claim 8, wherein the skin sulfonated rubber particles are about from 0.01 to 2 inches in general cross sectional distance, and are present in an amount about from 2 to 8 percent by weight of the matrix components.

11. The composition of claim 9, wherein the skin sulfonated plastic particles are about from 0.1 to 1 inch in general cross sectional distance.

12. A filled composition comprising a high performance, cured, light weight concrete containing a calcium-silicate cement having a calcium silicate network, a coarse aggregate, and a skin sulfonated particle aggregate, selected from the group consisting of skin-sulfonated rubber, skin-sulfonated plastic and a combination thereof, wherein the skin-sulfonated particle aggregate has skin sulfonated particles having a surface layer and an interior wherein the surface layer of the skin-sulfonated particles is sulfonated and the interior of the skin-sulfonated particles is essentially not sulfonated, a substantial amount of said skin sulfonated particle aggregate having a size about from 0.1 to 1 inch in general cross sectional distance, being embedded in at least a portion of a matrix containing said cement, wherein a bond exists between said skin sulfonated particle aggregate and said cement, which bond contains a sulfonate bridge to the calcium silicate network of said cement.

13. The composition of claim 12, wherein said calcium-silicate cement is a Portland cement and wherein said skin sulfonated particle aggregate is suitably derived from shredding or grinding of rubber tires, or from plastic waste selected from the group consisting of post-industrial and post-consumer waste.

14. The composition of claim 2, which contains the skin sulfonated rubber particles, which are derived from tires.

15. The composition of claim 3, which contains the skin sulfonated rubber particles, which are derived from tires.

16. The composition of claim 10, wherein the rubber particles are derived from tires.

17. The composition of claim 3, wherein the skin sulfonated particles are derived from recycled materials.

18. The composition of claim 11, wherein the skin sulfonated particles are derived from recycled materials.

19. A filled composition comprising a product prepared by curing a matrix selected from the group consisting of inorganic settable, organic resin, and cellulosic matrices, and combinations thereof, wherein the inorganic settable matrix is selected from the group consisting of a calcium-silicate cement, a calcium sulfate-containing cement, a phosphate-based cement, an aluminous cement, a magnesium oxy chlorite type cement, and combinations thereof;

the organic resin matrix is selected from the group consisting of an epoxy, a urethane, a urea-formaldehyde resin, a lignin, a binder made from a water based paint or roofing composition, or an asphalt emulsion, and combinations thereof; and the cellulosic matrix is selected from the group consisting of a simple cellulosic fiber material made from a slurry, and an intractable cellulosic polymeric mass made from action of an oxidizing agent on a wet cellulosics fabrication composition;

in at least a portion of which matrix is embedded skin sulfonated rubber particles having a surface layer and an interior, wherein the surface layer of said particles is sulfonated and the interior of said particles is essentially not sulfonated, present as an aggregate initially before any heating or pressing processing, present finally as a particle or solid residue thereof in the matrix and not in liquid solution, said particles being discrete, solid and derived from tires.

20. A filled composition comprising a product prepared by curing a matrix selected from the group consisting of inorganic settable, organic resin, and cellulosic matrices, and combinations thereof, wherein the inorganic settable matrix is selected from the group consisting of a calcium-silicate cement, a calcium sulfate-containing cement, a phosphate-based cement, an aluminous cement, a magnesium oxy chlorite type cement, and combinations thereof;

the organic resin matrix is selected from the group consisting of an epoxy, a urethane, a urea-formaldehyde resin, a lignin, a binder made from a water based paint or roofing composition, or an asphalt emulsion, and combinations thereof; and the cellulosic matrix is selected from the group consisting of a simple cellulosic fiber material made from a slurry, and an intractable cellulosic polymeric mass made from action of an oxidizing agent on a wet cellulosics fabrication composition;

in at least a portion of which matrix is embedded skin sulfonated plastic particles having a surface layer and an interior, wherein the surface layer of said particles is sulfonated and the interior of said particles is essentially not sulfonated, present as an aggregate initially before any heating or pressing processing, present finally as a particle or solid residue thereof in the matrix and not in liquid solution, said particles being discrete, solid and derived from recycled materials, wherein a substantial amount of said particles are at least about 0.1 inch in general cross sectional distance in two dimensions, and at least about about 0.003 inch in thickness.

* * * * *